United States Patent
Labdhe et al.

(10) Patent No.: US 12,506,612 B2
(45) Date of Patent: Dec. 23, 2025

(54) OFFLINE TWO-FACTOR AUTHENTICATION

(71) Applicant: MASTERCARD INTERNATIONAL INCORPORATED, Purchase, NY (US)

(72) Inventors: Siddhesh Labdhe, Mumbai (IN); Devanshu Bhardwaj, Hisar (IN); Kaushal Shetty, O'Fallon, MO (US)

(73) Assignee: MasterCard International Incorporated, Purchase, NY (US)

( * ) Notice: Subject to any disclaimer, the term of this patent is extended or adjusted under 35 U.S.C. 154(b) by 78 days.

(21) Appl. No.: 18/638,652

(22) Filed: Apr. 17, 2024

(65) Prior Publication Data

US 2025/0330324 A1    Oct. 23, 2025

(51) Int. Cl.
| | |
|---|---|
| *H04L 9/32* | (2006.01) |
| *H04L 9/08* | (2006.01) |
| *H04L 9/30* | (2006.01) |

(52) U.S. Cl.
CPC .......... *H04L 9/3226* (2013.01); *H04L 9/0866* (2013.01); *H04L 9/3073* (2013.01)

(58) Field of Classification Search
CPC .... H04L 9/3226; H04L 9/0866; H04L 9/3073
See application file for complete search history.

(56) References Cited

U.S. PATENT DOCUMENTS

| | | | |
|---|---|---|---|
| 2018/0096348 A1 | 4/2018 | Leite Netto et al. | |
| 2025/0202869 A1* | 6/2025 | Rennich | H04W 12/63 |
| 2025/0211440 A1* | 6/2025 | Douglas | H04L 9/3226 |

FOREIGN PATENT DOCUMENTS

| | | |
|---|---|---|
| AU | 2015264124 B2 | 11/2015 |
| WO | 2012042277 A1 | 4/2012 |

* cited by examiner

*Primary Examiner* — Izunna Okeke
(74) *Attorney, Agent, or Firm* — Barta Jones, PLLC

(57) ABSTRACT

The invention relates to a computer storage device, system, and method for secure offline authentications. An authentication device receives an authentication attempt from a user mobile device, decrypts an encrypted user identifier, and receives a two-factor authentication (2FA) code from a user. The device validates the authentication attempt based on the decrypted user identifier and the received 2FA code offline. The device tracks the number of validated authentication attempts and compares it to a threshold. When the number of validated authentication attempts exceeds the threshold, the 2FA code is automatically shared with a second computer storage device, allowing the user to validate an authentication attempt with both devices without inputting the 2FA code. The same entity controls both the computer storage device and the second computer storage device.

20 Claims, 7 Drawing Sheets

OFFLINE TWO-FACTOR AUTHENTICATION

BACKGROUND

Authentication methods and systems are crucial to securely prove a user's identity in various scenarios such as access control, online authentications, or login processes where security is valuable. Traditional authentication techniques often rely on password-based approaches that can be easily compromised due to weak or stolen credentials. To overcome these limitations, more advanced methods have been developed, such as encryption and two-factor authentication (2FA). However, these methods also have their drawbacks. For example, they need online connectivity for the secondary verification step. This dependence on internet connectivity renders them less convenient in applications where internet connectivity is not reliable. Current methods that rely on online connectivity to verify authentications fall back to less secure methods or prevent authentication entirely when internet connectivity is not available. Less secure authentication techniques are susceptible to tampering due to their reliance on single-device authentication and lack of two-factor authentication (2FA). The methods that depend on internet connectivity are less useful for applications where internet connectivity is not reliable.

SUMMARY

Some examples provide a computer storage device having computer-executable instructions stored that cause the computer to authenticate offline authentication attempts. The instructions cause the processor to perform operations including: receiving an authentication attempt from a user mobile device of a user, wherein the user mobile device comprises a processor configured to generate an encrypted user identifier (ID), wherein the authentication attempt comprises the encrypted user ID; decrypting the encrypted user ID; receiving a two-factor authentication (2FA) code from the user; validating the authentication attempt based on the decrypted user ID and the received 2FA code, wherein the computer storage device validates the authentication attempt offline; tracking a number of validated authentication attempts of the user mobile device; comparing the number of validated authentication attempts to a threshold; and automatically sharing the 2FA code with a second computer storage device when the number of validated authentication attempts of the user mobile device exceeds the threshold such that the user can validate an authentication attempt offline with the second computer storage device. A common entity controls both the computer storage device and the second computer storage device.

In some implementations, a system for offline secure authentications comprises a processor; and a computer storage medium storing instructions that are operative upon execution by the processor to: receive an authentication attempt from a user mobile device of a user via a first authentication device, wherein the authentication attempt comprises an authentication cryptogram, and wherein the user mobile device comprises a processor configured to generate the authentication cryptogram; validate the authentication attempt based on the authentication cryptogram; and send a validated authentication attempt response to the first authentication device, wherein a processor of the first authentication device executes instructions that are operative to: prompt the user to enroll in offline authentication with the first authentication device in response to receiving the validated authentication attempt response; receive confirmation from user to enroll in offline authentication with the first authentication device; receive a two-factor authentication (2FA) code from the user; store a user ID and the 2FA code in a secure element in the first authentication device; track a number of validated authentication attempt responses of the user received at the first authentication device; compare the number of validated authentication attempt responses to a threshold; and automatically share the 2FA code with a second authentication device when the number of validated authentication attempt responses of the user exceeds the threshold such that the user can authenticate offline with the second authentication device, wherein a common entity controls both the first authentication device and the second authentication device.

Other examples provide a method for offline secure authentications, the method comprising: receiving an authentication attempt, by a first authentication device, from a user mobile device of a user, wherein the user mobile device comprises a processor configured to generate an authentication cryptogram, and wherein the authentication attempt comprises a mobile device identifier, a user identifier, and the authentication cryptogram; sending the authentication attempt, by the first authentication device, to an authenticator; approving the authentication attempt, by the authenticator, based on the mobile device identifier, the user identifier, and the authentication cryptogram; sending a validated authentication attempt response, by the authenticator, to the first authentication device, receiving the validated authentication attempt response, by the first authentication device, from the authenticator; in response to receiving the validated authentication attempt, prompting the user to enroll in offline authentication, by the first authentication device, with the first authentication device; receiving confirmation from the user to enroll in offline authentication, by the first authentication device, with the first authentication device; receiving a two-factor authentication (2FA) code from the user, by the first authentication device; storing the mobile device identifier, the user identifier, and the 2FA code, by the first authentication device, in a secure element in the first authentication device; tracking, by the first authentication device, a number of validated authentication attempt responses of the user; comparing, by the first authentication device, the number of validated authentication attempt responses to a threshold; and automatically sharing, by the first authentication device, the 2FA code with a second authentication device when the number of validated authentication attempt responses of the user exceeds the threshold such that the user can authenticate offline with the second authentication device, wherein a common entity controls both the first authentication device and the second authentication device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings. Any of the figures may be combined into a single example or embodiment.

DETAILED DESCRIPTION

A more detailed understanding can be obtained from the following description, presented by way of example, in conjunction with the accompanying drawings. The entities, connections, arrangements, and the like that are depicted in, and in connection with the various figures, are presented by way of example and not by way of limitation. As such, any and all statements or other indications as to what a particular figure depicts, what a particular element or entity in a particular figure is or has, and any and all similar statements, that can in isolation and out of context be read as absolute and therefore limiting, can only properly be read as being constructively preceded by a clause such as "In at least some examples, . . . " For brevity and clarity of presentation, this implied leading clause is not repeated ad nauseum.

Aspects of the disclosure improve the security of offline authentications using two-factor authentication methods. Aspects of the disclosure provide an authentication apparatus, system, and method that securely authenticates users offline based on a 2FA code. After a threshold number of validations have been completed within a secured computing environment, the user performs offline authentications with multiple authentications devices within an entity's secure computing environment. Aspects of the disclosure use multiple authentications devices controlled by the same entity to share the 2FA code. All the authentication devices are within a secure computing environment of the entity such that the shared 2FA code remains secure.

The computing device operates in an unconventional manner at least by automatically sharing the 2FA code with other authentication devices to reduce processor, memory, and energy usage by the system, thereby improving functioning of the underlying computing device. Additionally, validating offline authentications removes the need for online connectivity to authenticate users, thereby reducing the networking resources used to carry out authentications under aspects of the disclosure.

For the purposes of this specification, an offline authentication is any authentication performed without the use of an authenticator outside of a secure computing environment controlled by an entity. "Computer-executable instructions" may be understood as software or program code that can be executed by a computer's processor.

Figure 1:
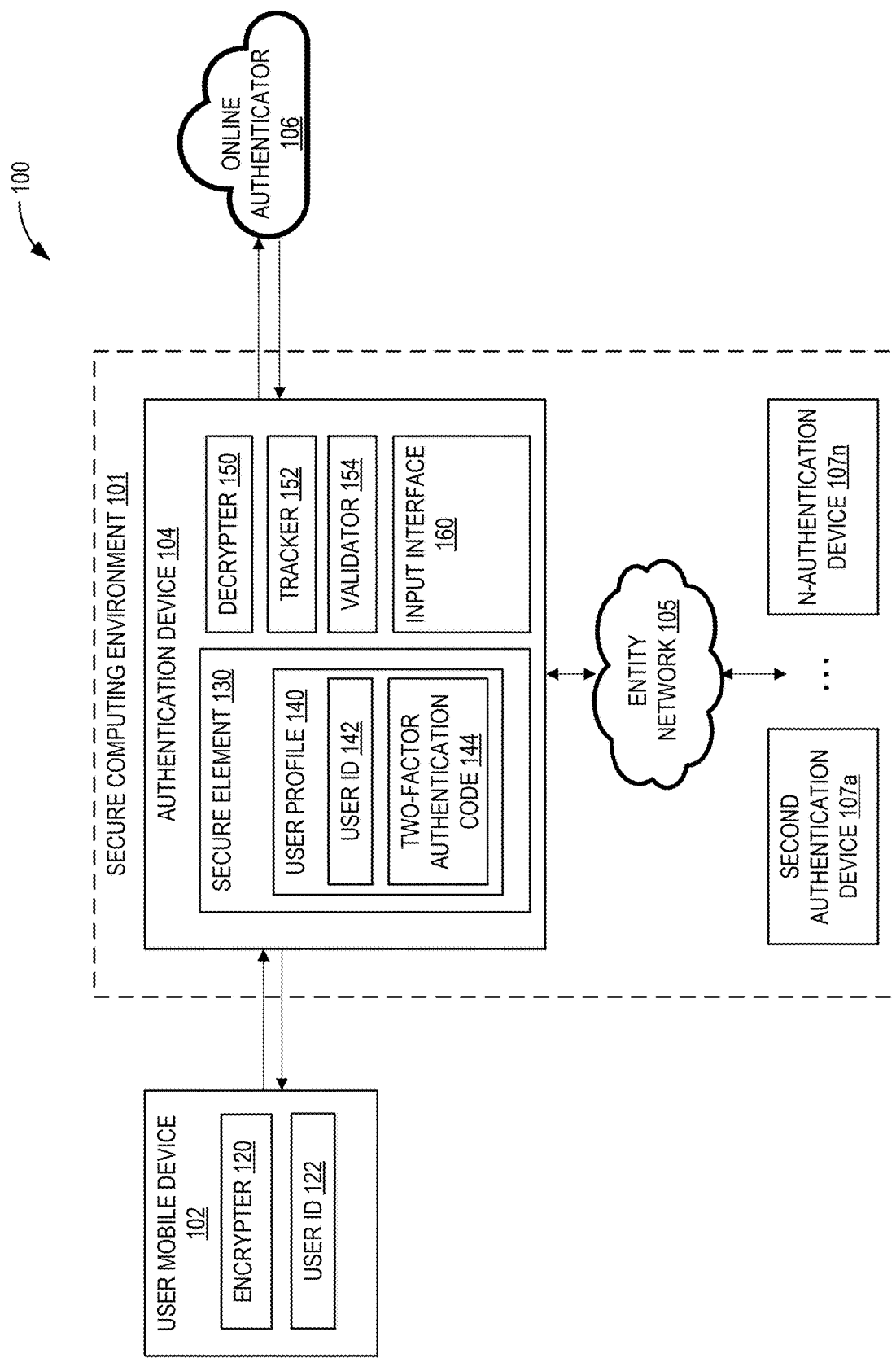
FIG. 1 is a block diagram illustrating an example system for performing offline authentications.

FIG. 1 illustrates a block diagram of a system 100 for performing offline authentications. An entity controls an authentication device 104, an entity network 105, and other authentication devices 107a-107n (collectively 107) in a secure computing environment 101. The authentication device 104 is in communication with an online authenticator 106 that validates authentication attempts received from a user mobile device 102. The system 100 is designed to enable secure user authentication processes without the need for continuous online connectivity.

The authentication device 104 manages the exchange of data with the user mobile device 102. A user mobile device 102 sends an authentication attempt comprising an encrypted user ID 122 to the authentication device. An encrypter 120 of the user mobile device 102 encrypts the user ID 122. A decrypter 150 of the authentication device 104 decrypts the user ID 122 using cryptographic protocols. In some implementations, the user ID 122 uniquely identifies the user themselves, such as a username, an account number, a user-specific password, or some combination thereof. In other implementations, the user ID 122 uniquely identifies the user mobile device 102, such as a device ID or a device-specific password. In yet other implementations, the decrypter 150 only partially decrypts the user ID 122, such as only decrypting a device ID but not a device-specific password. Using multiple encryption layers improves security and can safeguard confidential user or device information.

In many implementations following decryption, the authentication device 104 sends the authentication attempt, including the decrypted or partially decrypted user ID, to an online authenticator 106. The online authenticator 106 validates the authentication attempt and sends a validated authentication attempt response to the authentication device 104. In at least one version, both the authentication device 104 and the online authenticator 106 further encrypt and decrypt the exchanges of information between them. After receiving the validated authentication attempt response, the authentication device 104 authenticates the user. An online authenticator 106 permits the secure validation of the authentication attempt by ensuring the validation is performed on computer servers with the highest standards of data security.

In at least one implementation, the authentication device 104 also receives a two-factor authentication (2FA) code from the user and sends the 2FA code to the online authenticator 106 as part of the authentication attempt. The online authenticator 106 then validates the authentication attempt by comparing the decrypted user ID and the 2FA code with stored credentials. The use of a 2FA code ensures that the user attempting to authenticate is the same user associated with the user mobile device 102. The use of a 2FA code drastically reduces the chances of improper or fraudulent validation in the case of a misplaced user mobile device 102.

In some implementations, the authentication device 104 prompts the user to enroll in offline authentication with the authentication device 104 in response to receiving the validated authentication attempt response from the online authenticator 106. The user then decides whether to enroll in offline authentication. If so, then the authentication device 104 receives confirmation from the user to enroll in offline authentication with the authentication device 104. The user then inputs a 2FA code 144 at an input interface 160 of the authentication device 104. The 2FA code is used to authenticate the user with the authentication device 104 even if the authentication device 104 is offline. In some implementations, the authentication device 104 stores the user ID 142 and/or the 2FA code 144 in a secure element 130. In at least one implementation, the user ID 142 and the 2FA code 144 are stored together in a user profile 140 in the secure element 130. The secure element 130 securely stores data using secure techniques such as encryption.

After a user has enrolled in offline authentication with the authentication device 104, the user then begins future authentications with the authentication device 104 as described above. If the authentication device 104 is offline, then the authentication device 104 additionally prompts the user to input the 2FA code 144 into the input interface 160. After the user does so, a validator 154 of the authentication device 104 compares the input code with the 2FA code 144 stored in the secure element 130 and validates the authentication attempt by comparing the two codes. The authentication device 104 then authenticates the user. In some implementations, the authentication device 104 sends authentication details of the offline authentication to the online authenticator 106 after the authentication device 104 becomes online.

In some versions, a tracker 152 of the authentication device 104 tracks a number (e.g., a quantity) of validated authentication attempts of the user mobile device 102. The tracker 152 compares the number of validated authentication attempts to a threshold. In one version, the threshold is a number of validated authentication attempts before the authentication device 104 prompts the user to enroll in offline authentication. In another version, the threshold is a number of validated authentication attempts before the authentication device 104 shares the 2FA code 144 with other authentication devices 107. The use of a threshold reduces the likelihood of unauthorized authentications because the authentication devices will only validate offline authentications after the threshold is reached. In some implementations, the threshold quantity represents the exposure to possible fraudulent authentications. A greater threshold decreases the likelihood that an authentication device will receive a sufficient number of validated authentication attempts, and thus decreases the likelihood of enabling offline authentications. However, a lesser threshold enables a user to authenticate offline sooner, which improves user convenience. The threshold quantity can be determined based on the implementation of the disclosure.

In some implementations, the authentication device 104 automatically shares the 2FA code 144 with other authentication devices 107 via the entity network 105. In at least one implementation, the authentication device 104 shares the 2FA code 144 after a number of validated authentication attempt responses of the user exceeds a threshold. In these implementations, the user can authenticate offline with both the authentication device 104 and the other authentication devices 107. Sharing the 2FA code 144 with other authentication devices 107 improves user convenience because the user can now authenticate offline with multiple authentication devices instead of only the authentication device 104. Security is maintained because the authentication device 104, the other authentication devices 107, and the entity network 105 are within the same secure computing environment 101 controlled by the entity.

In at least one implementation, machine-readable instructions control or cause the authentication device 104 to automatically share the 2FA code 144 with the other authentication devices 107 when the number of validated authentication attempts of the user mobile device 102 exceeds the threshold, such that the second authentication devices can validate an authentication attempt offline. Depending on the implementation, the instructions are stored within memory of the authentication device 104 or are sent to the authentication device 104 via the entity network 105.

In at least one implementation, the user profile 140 can be synchronized or mirrored across the other authentication devices 107 based on a set of predetermined synchronization rules. Sharing the 2FA code after a number of validated authentication attempt responses of the user exceeds a threshold is one synchronization rule example. Other synchronization rules include limiting sharing to other authentication devices 107 in a specific geographic area or location, sharing the 2FA code for a limited amount of time, such as a month, or the duration of a school semester.

In some implementations, the authentication attempt is a user request to gain access to a building, room, storage container, facility, or other physical location. In other implementations, the authentication attempt is a user request to login to a network or computer at a terminal of the entity, such as a university computer terminal. In still other implementations, the authentication attempt is a payment transaction. Depending on the implementation, the user mobile device is a key fob, smart card, common access card, cellular phone, tablet, or some other mobile device with an integrated circuit. Additionally, depending on the implementation the authentication device is a access control device, such as an access control keypad, a card/fob reader, a smart lock, a computer terminal, a point-of-sale machine, or a mobile device.

Figure 2:
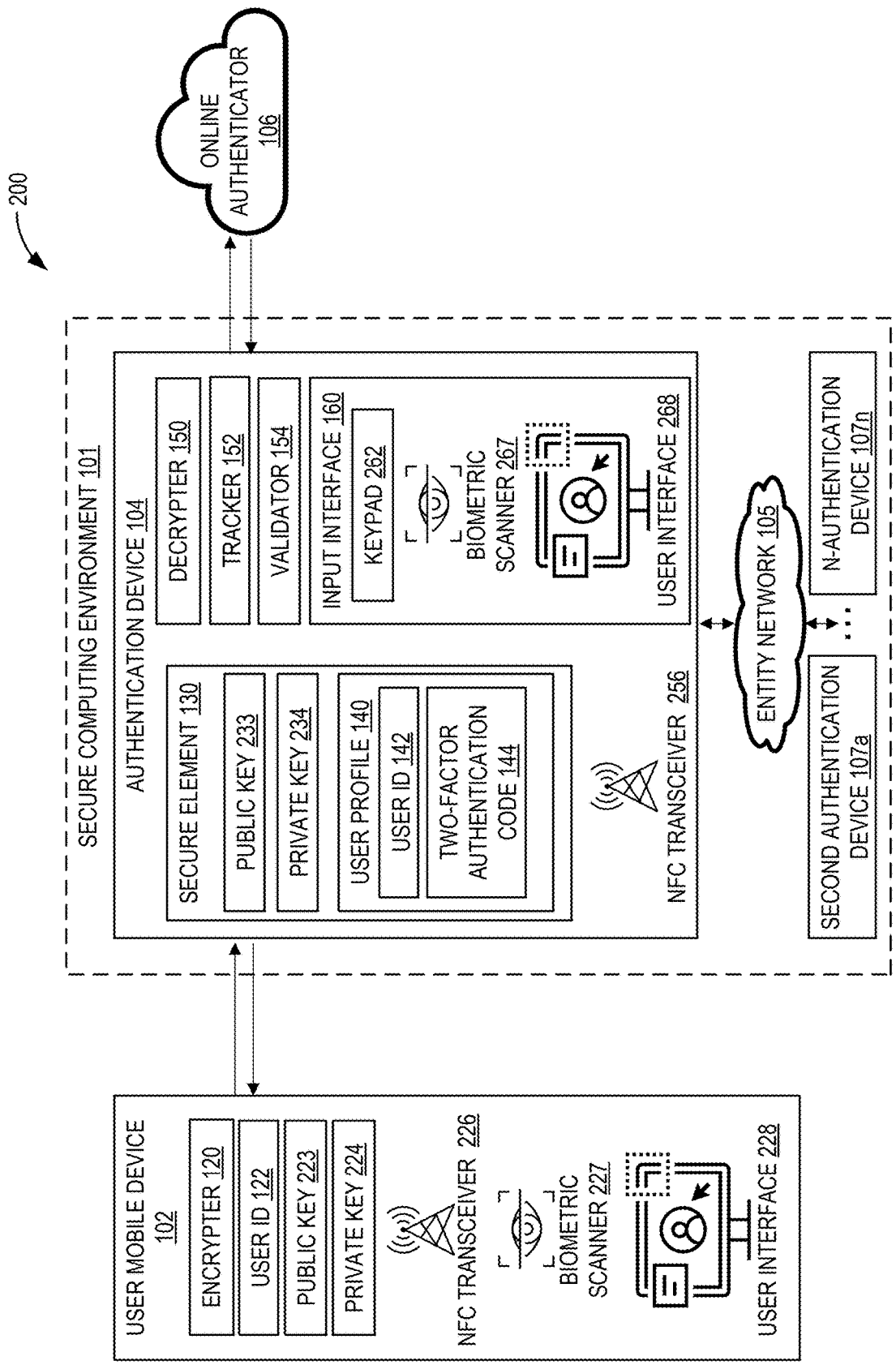
FIG. 2 is a block diagram illustrating an example system for performing offline authentications with public-private key encryption.

FIG. 2 illustrates a block diagram of a system 200 for performing offline authentications with public-private key encryption. Elements in system 200 that are the same as elements in system 100 of FIG. 1 retain the same figure numbers. A user mobile device 102 has a user device public key 223 and private key 224. The user mobile device 102 shares the user device public key 223 with the authentication device 104 but does not share the user device private key 224. The user device public key 223 and the user device private key 224 are a public-private key pair of the user mobile device 102 that cryptographically secure authentication attempts.

In some implementations, the user mobile device 102 at least partially encrypts an authentication attempt by generating an authentication cryptogram. The authentication cryptogram is based on the user device private key 224. In implementations where the authentication device 104 is online, the authentication device 104 is not required to decrypt the authentication cryptogram. Instead, the online authenticator 106 decrypts and validates the authentication cryptogram to validate the authentication attempt. In at least one implementation, the online authenticator 106 generates the public-private key pair of the user mobile device 102.

In other implementations, including where the user has enrolled in offline authentication, the authentication device 104 receives the authentication cryptogram and decrypts it using the user device public key 223 with a decrypter 150. The authentication device 104 then receives the 2FA code 144 from the user via the input interface 160 and validates the authentication attempt based on the decrypted authentication cryptogram and the 2FA code 144. In at least one implementation, the user inputs the 2FA code 144 via a keypad 262 of the input interface 160.

In some versions, the authentication device 104 also has an authentication device public key 233 and private key 234. The authentication device public key 233 and private key 234 are a public-private key pair of the authentication device 104 that cryptographically secure authentication attempts. The authentication device public key 233 and private key 234 are stored in a secure element 130 of the authentication device 104. The authentication device 104 shares the authentication device public key 234 with the user mobile device 102. The user mobile device 102 at least partially encrypts an authentication attempt with the user device private key 224 and the authentication device public key 233. In at least one version, the user mobile device 102 encrypts the user ID 122 based on the authentication device public key 233 with the encrypter 120. The authentication device 104 then receives the authentication attempt and decrypts the encrypted user ID 122 based on the authentication device private key 234.

The use of two public-private key pairs improves security by preventing the unencrypted transmission of sensitive data. Each device encrypts information with one half of a key pair and decrypts it with the corresponding other half. If the information is intercepted during transmission, it is meaningless without the correct key pair. Because each private key of the key pairs is never shared, the data remains secure.

In some implementations, the user mobile device 102 and the authentication device 104 comprise a near-field communication (NFC) transceiver 226 and 256 respectively. The user mobile device 102 transmits the authentication attempt to the authentication device 104 via NFC using the NFC transceiver 226 and the authentication device 104 receives the authentication attempt via the NFC transceiver 256. The use of a NFC transceiver improves user convenience because the user merely needs to tap the user mobile device 102 to the authentication device 104 to initiate an authentication attempt.

In some versions, the user mobile device 102 or the authentication device 104 comprise a biometric scanner 227 or 267 respectively. The biometric scanner 227 or 267 scans the user as part of an authentication attempt. In at least one version, the 2FA code 144 is based on a biometric scan of the user made with the biometric scanner 227 or 267.

In some implementations, the user mobile device 102 or the authentication device 104 comprise a user interface (UI) 228 or 268 respectively. The UI 228 or 268 enables a user to interface with the user mobile device 102 or the authentication device 104 respectively. In some arrangements, the UI 228 or 268 is configured to display icons to the user representing an authentication attempt, including details of an authentication attempt. In at least one arrangement, the authentication device 104 prompts the user to enroll in offline authentication by displaying icons on the UI 228 or 268. In another arrangement, the authentication device 104 displays icons representing a validated authentication attempt on the UI 228 or 268.

In some versions, the authentication device 104 shares the generated user profile 140 with the entity network 105. In at least one version, the authentication device 104 additionally shares the user device public key 223 with the entity network 105. The entity network 105 stores the user profile 140 and the user device public key 223 in a cloud key chain associated with the user. When the user initiates an offline authentication attempt with any other authentication device 107, that authentication device requests the user profile 140 and the user device public key 223 from the cloud key chain. The entity network 105 sends the user profile and the user device public key 223 to that other authentication device 107. This cloud-based implementation improves data security by storing the data remotely.

Figure 3:
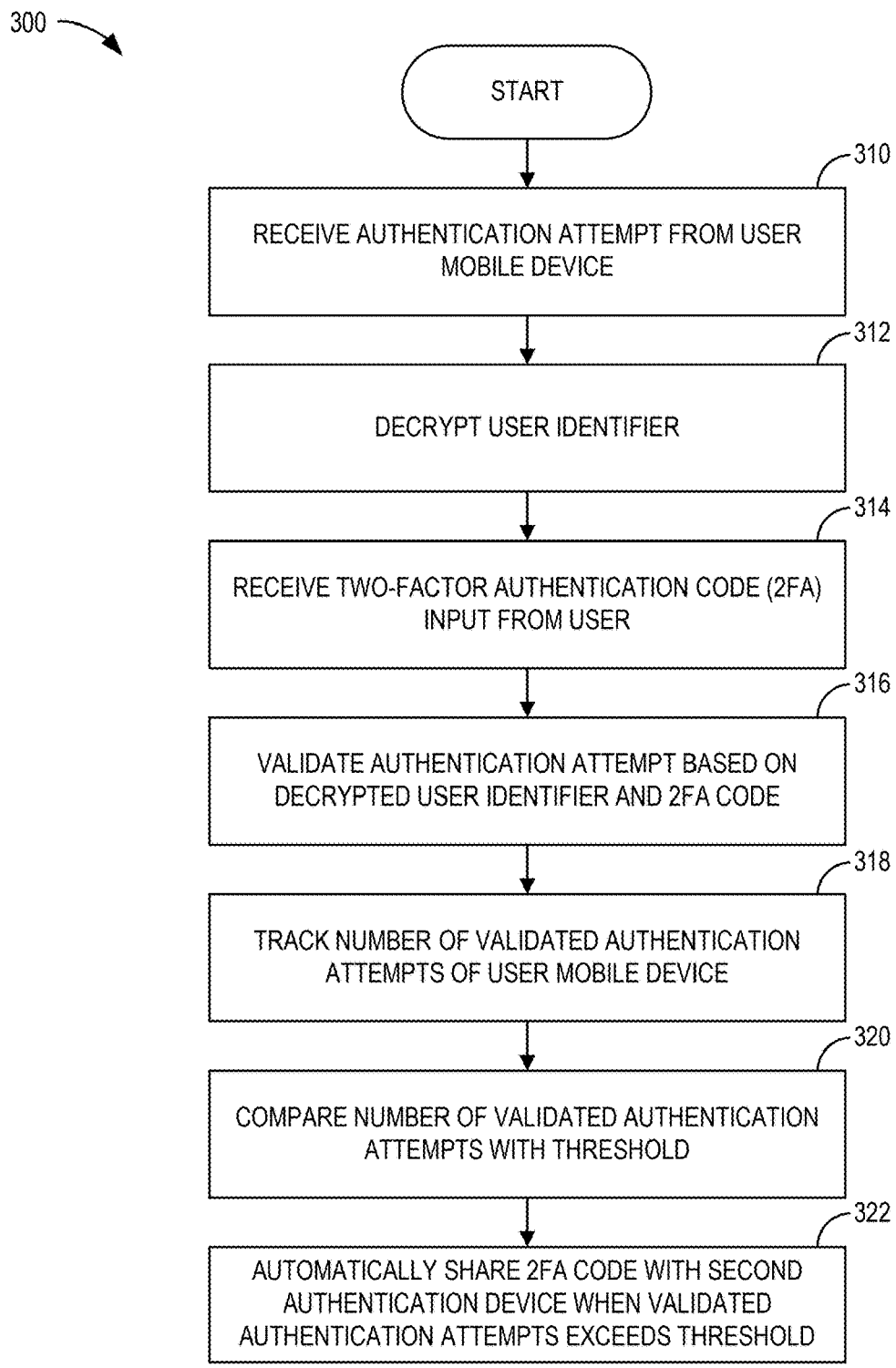
FIG. 3 is a flow chart illustrating an example method for performing offline authentications.

FIG. 3 is an exemplary flow chart illustrating a method 300 for performing offline authentications. The method 300 can be implemented according to systems 100 or 200 shown in FIGS. 1 and 2 respectively. The method 300 is implemented with a computer storage device having computer-executable instructions stored in the computer storage device. When the instructions are executed by a computer, the computer performs the operations of the method 300. In some implementations, the computer storage device is the first authentication device 104 of FIGS. 1 and 2.

The method 300 starts with receiving an authentication attempt from a user mobile device of a user at 310. The user mobile device comprises a processor that is configured to generate an encrypted user identifier (ID). The authentication attempt includes the encrypted user ID. The user ID represents the user of the user mobile device. Encrypting the user ID protects the user ID from being disclosed if the authentication attempt is intercepted. In at least one implementation, the user mobile device encrypts the user ID based on a user mobile device private key.

The method 300 continues with decrypting the encrypted user ID at 312. In some implementations, the encrypted user ID is decrypted based on a user mobile device public key. The user mobile device public and private key form a public-private key pair to secure the authentication attempt.

Then, the method 300 continues with receiving a two-factor authentication (2FA) code input from the user at 314. The 2FA code is a second layer of security in the authentication attempt. If the user mobile device is misplaced, the 2FA code requirement prevents unauthorized authentications with the computer storage device. In some implementations, the computer storage device stores the 2FA code in a secure element of the computer storage device.

The next operation is validating the authentication attempt based on the decrypted user ID and the received 2FA code at 316. In some implementations, the computer storage device validates the authentication attempt offline. To validate offline, the computer storage device compares the decrypted user ID and the received 2FA code with a stored profile of the user. If the user ID and 2FA codes match, then the authentication attempt is validated and the computer storage device authenticates the user.

The method 300 continues with tracking a number of validated authentication attempts of the user mobile device at 318. In some implementations, the number of validated authentication attempts is associated with a user profile of the user.

The next operation is comparing the number of validated authentication attempts to a threshold at 320. Here, the threshold is a number of validated authentication attempts before the 2FA code is shared with a second authentication device. The use of a threshold permits multiple devices to authenticate the user offline while maintaining security. The threshold quantity depends on the intensity of security desired for the implementation.

The 2FA code is automatically shared with a second authentication device when the number of validated authentication attempts of the user mobile device exceeds the threshold at 322. A common entity controls both the computer storage device and the second authentication device. Sharing the 2FA code enables the user to validate an authentication attempt offline with the second authentication device. In some implementations, the second authentication device is a second computer storage device.

Figure 4:
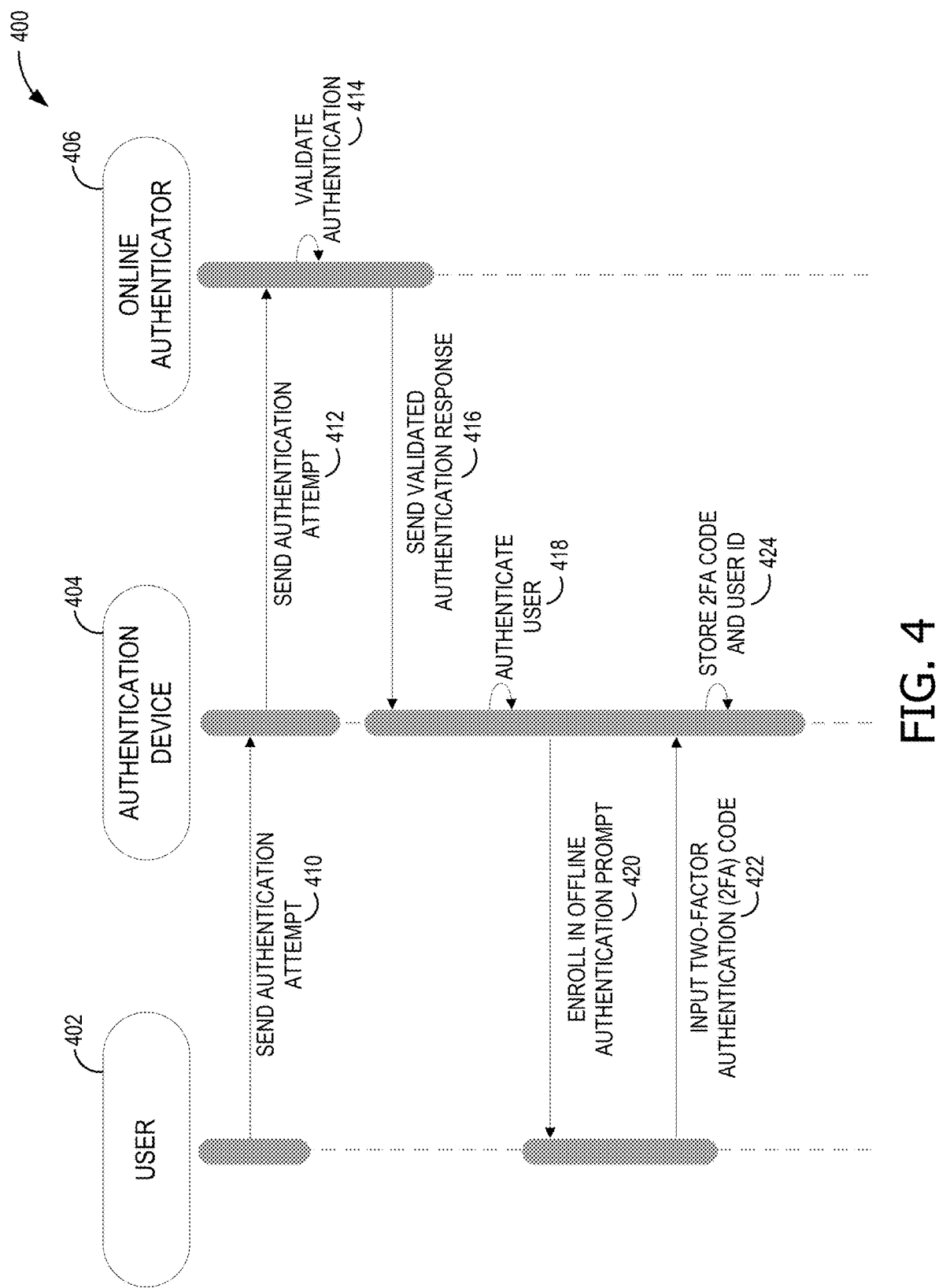
FIG. 4 is a flowchart illustrating an example method of onboarding a user for offline authentications.

FIG. 4 is an exemplary flowchart illustrating a method 400 of onboarding a user for offline authentications. Computer storage devices representing a user 402, an authentication device 404, and an online authenticator 406 store computer-executable instructions to implement the method. When the instructions are executed by one or more computers, the computers perform the operations of the method 400. The method 400 can be implemented according to systems 100 or 200 shown in FIGS. 1 and 2 respectively.

Method 400 begins with the user 402 sending an authentication attempt to the authentication device 404 at 410. In some implementations, the computer storage device representing the user 402 is a user mobile device. The authentication attempt comprises a user identifier (ID) for authenticating the user. In some implementations, the authentication device 404 decrypts the user ID using an authentication device private key, a user mobile device public key, or both depending on the key pair with which the user ID is encrypted.

Next, the authentication device 404 sends the authentication attempt to the online authenticator 406 at 412. The online authenticator 406 receives the authentication attempt and validates the authentication attempt at 414. In some implementations, the online authenticator 406 decrypts an authentication cryptogram generated by the user 402 to validate the authentication attempt.

Then, the online authenticator 406 sends a validated authentication response to the authentication device 404 at 416. The authentication device receives the validated authentication response and authenticates the user at 418.

The method 400 continues with the authentication device 404 sending a prompt to the user 402 to enroll in offline authentication at 420. The user 402 decides whether to enroll and inputs a two-factor authentication (2FA) code to the authentication device 404 at 422 if so.

The authentication device 404 stores the 2FA code and the user ID at 424. The 2FA code and the user ID are stored in a secure element of the authentication device 104.

Figure 5:
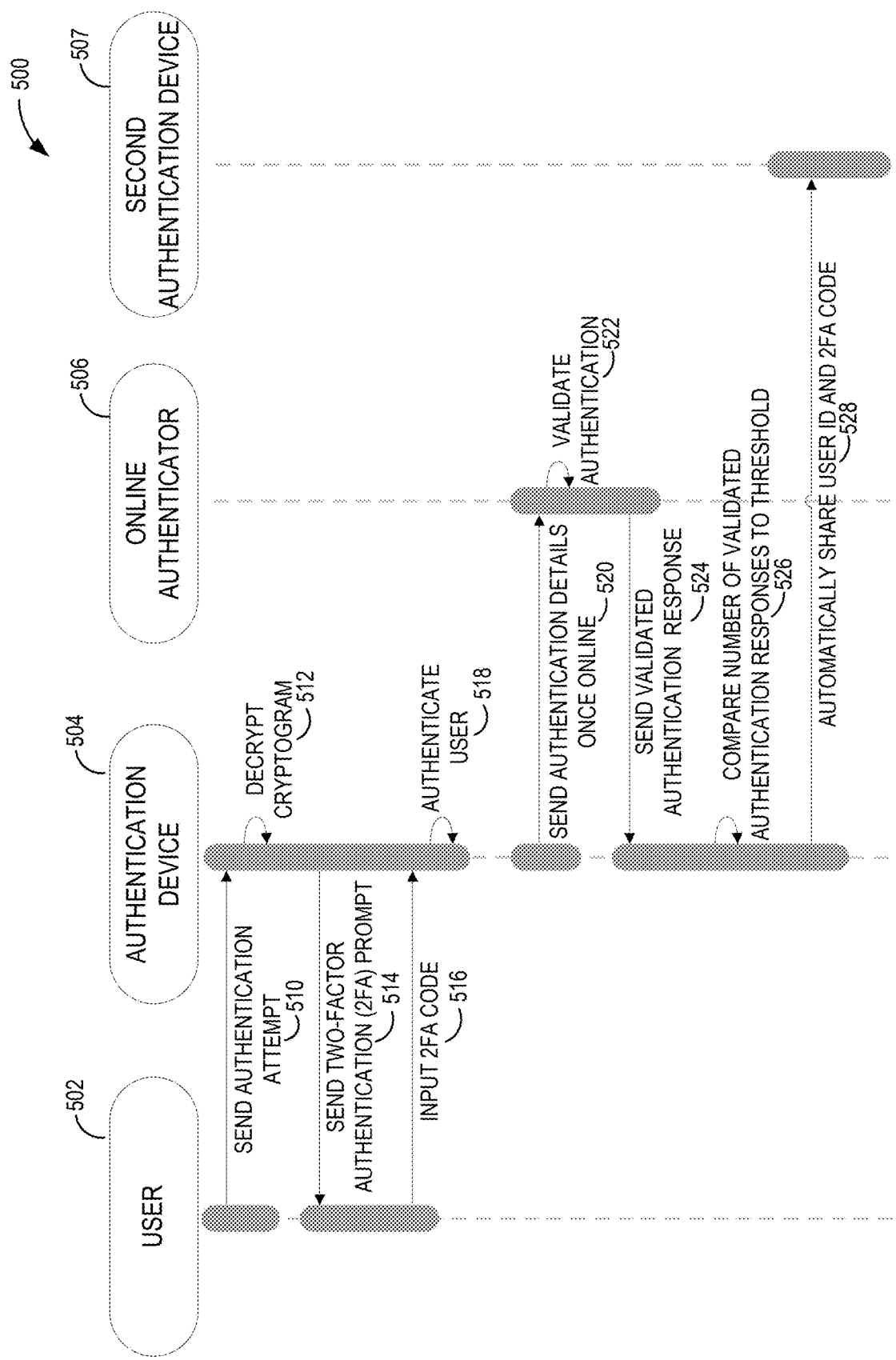
FIG. 5 is a flowchart illustrating an example method of performing offline authentications.

FIG. 5 is an exemplary flowchart illustrating a method 500 of performing offline authentications. Computer storage devices representing a user 502, an authentication device 504, an online authenticator 506, and a second authentication device 507 store computer-executable instructions to implement the method. When the instructions are executed by one or more computers, the computers perform the operations of the method 500. The method 500 can be implemented according to systems 100 or 200 shown in FIGS. 1 and 2 respectively.

Method 500 begins with the user 502 sending an authentication attempt to the authentication device 504 at 510. In some implementations, the computer storage device representing the user 502 is a user mobile device. The authentication attempt comprises an authentication cryptogram generated by the user 502 for authenticating the user 502. The authentication cryptogram comprises an encrypted user identifier (ID). In some implementations, the authentication cryptogram is based on an authentication device public key shared by the authentication device 504.

The authentication device 504 receives the authentication attempt and decrypts the authentication cryptogram at 512. In some implementations, the authentication device 504 decrypts the authentication cryptogram based on an authentication device private key stored in a secure element of the authentication device 504.

The authentication device 504 then sends a prompt to the user 502 to input a two-factor authentication (2FA) code at 514. The user 502 responds by inputting the 2FA code in the authentication device 504 at 516. Based on the decrypted user ID and the 2FA code, the authentication device 504 authenticates the user 502 offline at 518. The authentication device 504 stores authentication details relating to the offline authentication of the user, including the user ID, for future online validation.

Next, the authentication device 504 sends authentication details relating to the offline authentication of the user 502 to the online authenticator 506 once online at 520. The authentication details include the authentication cryptogram. In some implementations, a substantial amount of time passes between the offline authentication and the authentication device obtaining online connectivity. In at least one embodiment, the authentication device 504 stores the authentication details in memory to prevent data loss in the case of a loss of power.

The online authenticator 506 receives the authentication details and validates the offline authentication at 522. The online authenticator 506 validates the offline authentication based on the authentication cryptogram. Then, the online authenticator 506 sends a validated authentication response to the authentication device 504 at 524. The authentication device 504 tracks a number of validated authentication responses of the user 502 received from the online authenticator 506.

Then, the authentication device 504 compares the number of validated authentication responses to a threshold at 526. In some implementations, the threshold is a numerical limit set within the system's parameters. When the count of validated authentication attempts reaches this limit, the authentication device 504 automatically shares the user ID and 2FA code with a second authentication device 507 at 528. In some implementations, the second authentication device 507 receives the user ID and 2FA code via an entity network. The entity network stores the user ID and 2FA code in a user profile and sends the user profile to the second authentication device 507.

Figure 6:
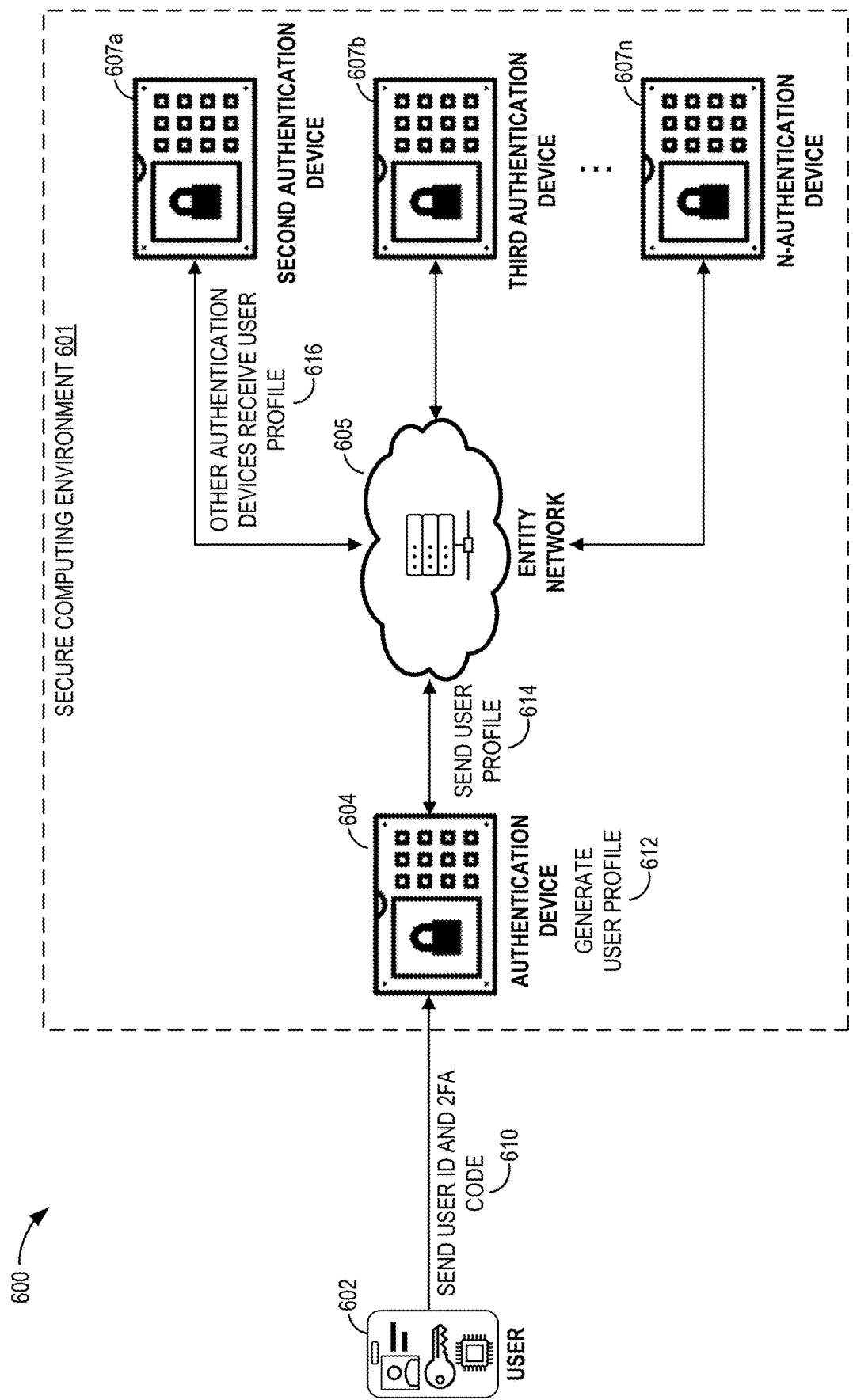
FIG. 6 is a flow chart illustrating an example of sharing a user profile in a secure computing environment.

FIG. 6 is an exemplary flow chart illustrating a method 600 for sharing a user profile in a secure computing environment 601. Computer storage devices representing a user 602, an authentication device 604, an entity network 605, and other authentication devices 607*a*-607*n* (collectively 607) store computer-executable instructions to implement the method. When the instructions are executed by one or more computers, the computers perform the operations of the method 600. The method 600 can be implemented according to systems 100 or 200 shown in FIGS. 1 and 2 respectively.

The method 600 begins with the user 602 sending a user identifier (ID) and a two-factor authentication (2FA) code to the authentication device 604 at 610. In some implementations, the user ID and 2FA code are sent as part of an authentication attempt for authenticating the user 602. In at least one implementation, the computer storage device representing the user 602 is a user mobile device.

The authentication device 604 receives the user ID and 2FA code from the user 602 and generates a user profile at 612. The user profile comprises the user ID and the 2FA code of the user 602. In some implementations, the authentication device 604 stores the user profile in a secure element of the authentication device 604.

Then, the authentication device 604 sends the user profile to the entity network 605 at 614. In some implementations, the entity network 605 is a transitory medium that does not store data sent through it. In other implementations, the entity network 605 comprises a computer storage device that stores the user profile in a cloud key chain. In these implementations, the entity network 605 functions as a secure central repository for the entity. Sensitive data that might be at risk of disclosure can instead be stored within the entity network 605 and sent to an authentication device (such as 604 or 607) to authenticate a user 602.

Finally, the entity network 605 sends and the other authentication devices 607 receive the user profile at 616. The authentication device 604 and the other authentication devices 607 are communicably coupled to the entity network 605. In many implementations, the entity network 605 is configured to send the user profile to the other authentication devices 607 even if the entity network 605 is offline. In at least one implementation, the other authentication devices 607 are the same type of device as the authentication device 604. Device types can include control access keypads, computer terminals, and point-of-sale machines among others.

In some implementations, rather than storing the user profile locally on each authentication device, the entity network 605 sends the user profile to the corresponding authentication device whenever a user initiates an authentication attempt. This cloud-based approach reduces the reliance on physical storage on individual devices and provides a centralized, secure repository for user profiles.

In at least one implementation, the entity network 605 additionally stores a user device public key of the user 602 in the cloud key chain. Whenever a user initiates an offline authentication attempt with an authentication device, the authentication device requests the user profile and user device public key from the cloud key chain. The entity network 605 then sends both the user profile and user device public key to the authentication device. This enables seamless profile information sharing across different authentication devices. Other implementations allow the cloud key chain to store personalized settings, loyalty programs, credit history, and preferences of the user 602 regardless of the specific authentication device they interact with. By securely recording and associating offline authentications with a user's profile, an entity can analyse authentication behaviour, identify user preferences, and personalize the user experience accordingly.

Exemplary Operating Environment

Figure 7:
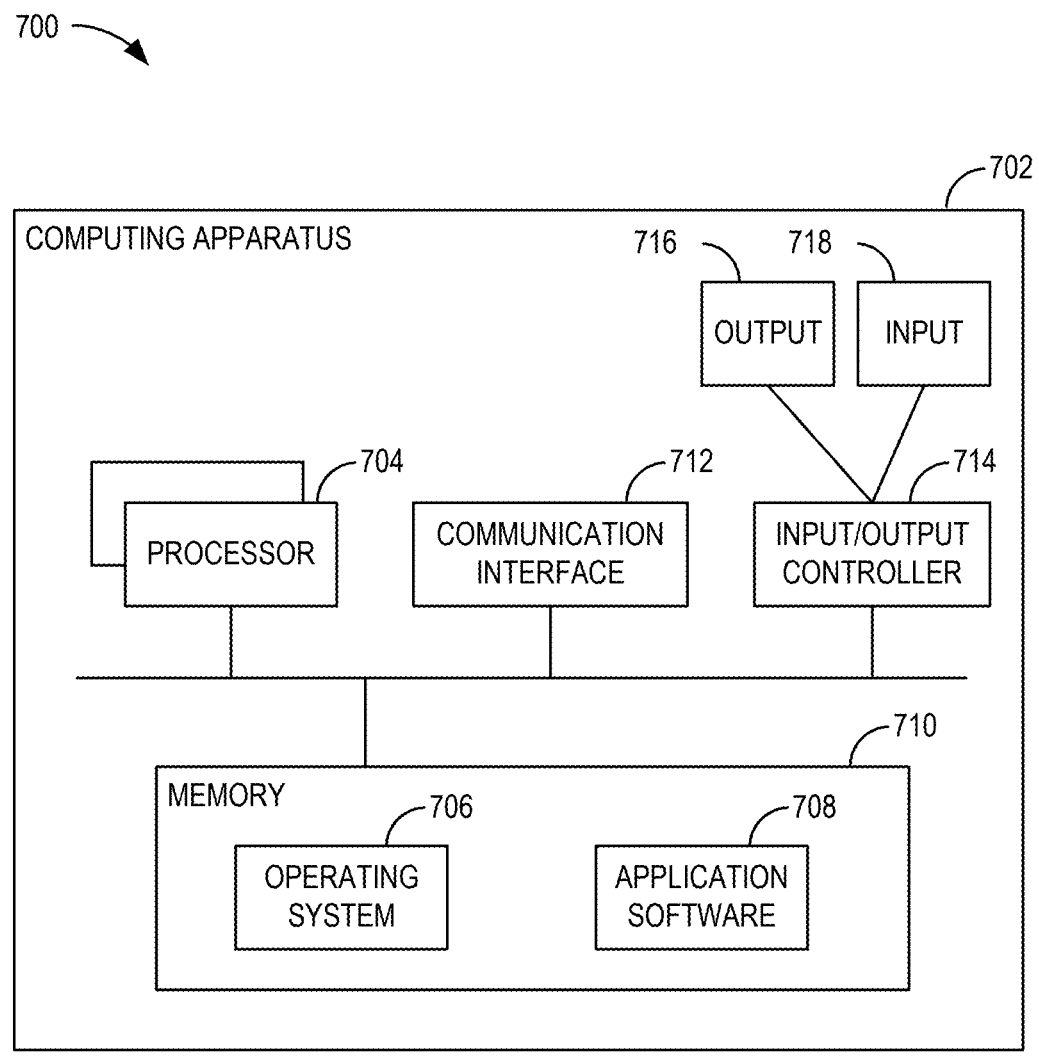
FIG. 7 is a block diagram illustrating an example computing device suitable for implementing various aspects of the disclosure.

The present disclosure is operable with a computing apparatus according to an embodiment as a functional block diagram of a computing system 700 in FIG. 7. In an embodiment, components of a computing apparatus 702 may be implemented as a part of an electronic device according to one or more embodiments described in this specification. The computing apparatus 702 comprises one or more processors 704 which may be microprocessors, controllers, or any other suitable type of processors for processing computer executable instructions to control the operation of the electronic device. Alternatively, or in addition, the processor 704 is any technology capable of executing logic or instructions, such as a hardcoded machine. Platform software comprising an operating system 706 or any other suitable platform software may be provided on the apparatus 702 to enable application software 708 to be executed on the device.

Computer executable instructions may be provided using any computer-readable media that are accessible by the computing apparatus 702. Computer-readable media may include, for example, computer storage media such as a memory 710 and communications media. Computer storage media, such as the memory 710, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus.

In contrast, communication media may embody computer readable instructions, data structures, program modules, or the like in a modulated data signal, such as a carrier wave, or other transport mechanism. As defined herein, computer storage media do not include communication media. Therefore, a computer storage medium does not include a propagating signal. Propagated signals per se are not examples of computer storage media. Although the computer storage medium (the memory 710) is shown within the computing apparatus 702, it will be appreciated by a person skilled in the art that the storage may be distributed or located remotely and accessed via a network or other communication link (e.g., using a communication interface 712).

The computing apparatus 702 may comprise an input/output controller 714 configured to output information to one or more output devices 716, for example a display or a speaker, which may be separate from or integral to the electronic device. The input/output controller 714 may also be configured to receive and process an input from one or more input devices 718, for example, a keyboard, a microphone, or a touchpad. In one embodiment, the output device 716 may also act as the input device. An example of such a device may be a touch sensitive display. The input/output controller 714 may also output data to devices other than the output device, e.g., a locally connected printing device. In some embodiments, a user may provide input to the input device(s) 718 and/or receive output from the output device(s) 716.

The functionality described herein can be performed, at least in part, by one or more hardware logic components. According to an embodiment, the computing apparatus 702 is configured by the program code when executed by the processor 704 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

Additional Examples

An exemplary computer storage device includes computer-executable instructions stored thereon, which, upon execution by a computer, cause the computer to perform operations comprising: receiving an authentication attempt from a user mobile device of a user, wherein the user mobile device comprises a processor configured to generate an encrypted user identifier (ID), wherein the authentication attempt comprises the encrypted user ID; decrypting the encrypted user ID; receiving a two-factor authentication (2FA) code from the user; validating the authentication attempt based on the decrypted user ID and the received 2FA code, wherein the computer storage device validates the authentication attempt offline; tracking a number of validated authentication attempts of the user mobile device; comparing the number of validated authentication attempts to a threshold; and automatically sharing the 2FA code with a second computer storage device when the number of validated authentication attempts of the user mobile device exceeds the threshold such that the user can validate an authentication attempt offline with the second computer storage device, wherein a common entity controls both the computer storage device and the second computer storage device.

In some examples, the computer storage device comprises instructions that cause the computer to perform additional operations comprising: sending the authentication attempt to an online authenticator; receiving a validated authentication attempt response from the online authenticator; in response to receiving the validated authentication attempt response, prompting the user to enroll in offline authentication with the computer storage device; and receiving confirmation from the user to enroll in offline authentication with the computer storage device. In further examples, additional operations include storing the 2FA code in a secure element in the computer storage device.

In other examples, the computer storage device comprises instructions that cause the computer to perform additional operations comprising: receiving an authentication cryptogram generated by the user mobile device, wherein the authentication cryptogram is based on a user device private key, and wherein the authentication attempt comprises the authentication cryptogram; and decrypting the authentication cryptogram based on a user device public key, wherein the user device public key and the user device private key are a public-private key pair of the user mobile device. In at least one example, the online authenticator generates the public-private key pair of the user mobile device. In yet other examples, operations include sharing an authentication device public key with the user mobile device, wherein the user mobile device encrypts the user ID based on the authentication device public key; and wherein decrypting the encrypted user ID is based on an authentication device private key, and wherein the authentication device public key and authentication device private key are a public-private key pair.

In additional examples, the computer storage device comprises instructions that cause the computer to perform additional operations wherein automatically sharing the 2FA code with the second computer storage device is performed via an entity network, wherein the entity network stores the 2FA code and the user ID, wherein the entity network shares the 2FA code with the second computer storage device upon receiving the user ID from the second computer storage device. In yet additional examples, operations include retrieving a user device public key from the entity network, wherein the entity network stores the user device public key, wherein decrypting the encrypted user ID is based on the user device public key.

In still further examples, the computer storage device comprises instructions that cause the computer to perform additional operations comprising generating a user profile of the user, wherein the user profile comprises the user ID, the 2FA code, and a user device public key. Further examples include operations comprising storing the user profile in a secure element of the computer storage device.

In yet additional examples, the computer storage device further comprises a user interface, wherein the computer storage device prompts the user to enroll in offline authentication with the computer storage device by displaying an enrollment prompt on the user interface. In at least one example, the computer storage device further comprises a biometric scanner, wherein the 2FA code is based on a biometric scan of the user made with the biometric scanner. In at least another example, the computer storage device further comprises a Near-Field Communications (NFC) transceiver. In at least a still further example, the computer storage device is of the same type of device as the computer storage device.

An exemplary system includes a processor; and a computer storage medium storing instructions that are operative upon execution by the processor to: receive an authentication attempt from a user mobile device of a user via a first authentication device, wherein the authentication attempt comprises an authentication cryptogram, and wherein the user mobile device comprises a processor configured to generate the authentication cryptogram; validate the authentication attempt based on the authentication cryptogram; and send a validated authentication attempt response to the first authentication device, wherein a processor of the first authentication device executes instructions that are operative to: prompt the user to enroll in offline authentication with the authentication device in response to receiving the validated authentication attempt response; receive confirmation from user to enroll in offline authentication with the authentication device; receive a two-factor authentication (2FA) code from the user; store a user ID and the 2FA code in a secure element in the authentication device; track a number of validated authentication attempt responses of the user received at the authentication device; compare the number of validated authentication attempt responses to a threshold; and automatically share the 2FA code with a second authentication device when the number of validated authentication attempt responses of the user exceeds the threshold such that the user can authenticate offline with the second authentication device, wherein a common entity controls both the first authentication device and the second authentication device.

In some examples, the system comprises further instructions that are operative upon execution by the processor to generate a public-private key pair for the user mobile device, wherein the authentication cryptogram is based on a user device private key. In other examples, additional instructions cause the processor to receive authentication details of an offline authentication from the first authentication device, wherein the authentication details comprise an authentication cryptogram and the 2FA code; and validate the offline authentication based on the authentication cryptogram and the 2FA code. In still other examples, additional instructions cause the processor to send a validated authentication response to the first authentication device upon validating the offline authentication.

An exemplary method comprises receiving an authentication attempt, by a first authentication device, from a user mobile device, wherein the user mobile device comprises a processor configured to generate an authentication cryptogram, and wherein the authentication attempt comprises a mobile device identifier, a user identifier, and the authentication cryptogram; sending the authentication attempt, by the first authentication device, to an authenticator; approving the authentication attempt, by the authenticator, based on the mobile device identifier, the user identifier, and the authentication cryptogram; sending a validated authentication attempt response, by the authenticator, to the first authentication device, receiving the validated authentication attempt response, by the first authentication device, from the authenticator; in response to receiving the validated authentication attempt, prompting the user to enroll in offline authentication, by the first authentication device, with the first authentication device; receiving confirmation from user to enroll in offline authentication, by the first authentication device, with the first authentication device; receiving a two-factor authentication (2FA) code from the user, by the first authentication device; storing the mobile device identifier, the user identifier, and the 2FA code, by the first authentication device, in a secure element in the first authentication device; tracking, by the first authentication device, a number of validated authentication attempt responses of the user; comparing, by the first authentication device, the number of validated authentication attempt responses to a threshold; and automatically sharing, by the first authentication device, the 2FA code with a second authentication device when the number of validated authentication attempt responses of the user exceeds the threshold such that the user can authenticate offline with the second authentication device, wherein a common entity controls both the first authentication device and the second authentication device.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent can take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Within the scope of this application, it is expressly intended that the various aspects, embodiments, examples, and alternatives set out in the preceding paragraphs, in the claims and/or in the description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim, accordingly, including the right to amend any originally filed claim to depend from and/or incorporate any feature of any other claim although not originally claimed in that manner.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A computer storage device having computer-executable instructions stored thereon, which, upon execution by a computer, cause the computer to perform operations comprising:
    receiving an authentication cryptogram generated by a user mobile device, wherein the authentication cryptogram is based on a user device private key;
    receiving an authentication attempt from the user mobile device of a user, wherein the user mobile device comprises a processor configured to generate an encrypted user identifier (ID), wherein the authentication attempt comprises the encrypted user ID and the authentication cryptogram;
    decrypting the encrypted user ID;
    decrypting the authentication cryptogram based on a user device public key, wherein the user device public key and the user device private key are a public-private key pair of the user mobile device, wherein the public-private key pair of the user mobile device is generated by an online authenticator;
    receiving a two-factor authentication (2FA) code from the user;
    validating the authentication attempt based on the decrypted user ID and the received 2FA code, wherein the computer storage device validates the authentication attempt offline;
    tracking a number of validated authentication attempts of the user mobile device;
    comparing the number of validated authentication attempts to a threshold; and
    automatically sharing the 2FA code with a second computer storage device when the number of validated authentication attempts of the user mobile device exceeds the threshold, such that the second computer storage device can validate an authentication attempt offline,
    wherein a common entity controls both the computer storage device and the second computer storage device.

2. The computer storage device of claim 1, having computer-executable instructions stored thereon, which, upon execution by the computer, cause the computer to perform operations further comprising:
    sending the authentication attempt to the online authenticator;
    receiving a validated authentication attempt response from the online authenticator;
    in response to receiving the validated authentication attempt response, prompting the user to enroll in offline authentication with the computer storage device; and
    receiving confirmation from the user to enroll in offline authentication with the computer storage device.

3. The computer storage device of claim 2, having computer-executable instructions stored thereon, which, upon execution by the computer, cause the computer to perform operations further comprising: storing the 2FA code in a secure element in the computer storage device.

4. The computer storage device of claim 1, having computer-executable instructions stored thereon, which, upon execution by the computer, cause the computer to perform operations further comprising:
    sharing an authentication device public key with the user mobile device,
    wherein the user mobile device encrypts the user ID based on the authentication device public key; and
    wherein decrypting the encrypted user ID is based on an authentication device private key, and wherein the authentication device public key and authentication device private key are a public-private key pair.

5. The computer storage device of claim 1,
    wherein automatically sharing the 2FA code with the second computer storage device is performed via an entity network,
    wherein the entity network stores the 2FA code and the user ID,
    wherein the entity network shares the 2FA code with the second computer storage device upon receiving the user ID from the second computer storage device.

6. The computer storage device of claim 5, having computer-executable instructions stored thereon, which, upon execution by the computer, cause the computer to perform operations further comprising:
    retrieving the user device public key from the entity network, wherein the entity network stores the user device public key,
    wherein decrypting the encrypted user ID is based on the user device public key.

7. The computer storage device of claim 1, having computer-executable instructions stored thereon, which, upon execution by the computer, cause the computer to perform operations further comprising:
    generating a user profile of the user, wherein the user profile comprises the user ID, the 2FA code, and the user device public key.

8. The computer storage device of claim 7, having computer-executable instructions stored thereon, which, upon execution by the computer, cause the computer to perform operations further comprising:
    storing the user profile in a secure element of the computer storage device.

9. The computer storage device of claim 1, further comprising a user interface, wherein the computer storage device prompts the user to enroll in offline authentication with the computer storage device by displaying an enrollment prompt on the user interface.

10. The computer storage device of claim 1, further comprising a biometric scanner, wherein the 2FA code is based on a biometric scan of the user made with the biometric scanner.

11. The computer storage device of claim 1, further comprising a Near-Field Communications (NFC) transceiver.

12. The computer storage device of claim 1, wherein the second computer storage device is of a same type of device as the computer storage device.

13. A system for offline secure authentications, the system comprising:
    a processor; and
        a computer storage medium storing instructions that are operative upon execution by the processor to:
    receive an authentication attempt from a user mobile device of a user via a first authentication device, wherein the authentication attempt comprises an authentication cryptogram, and wherein the user mobile device comprises a processor configured to generate the authentication cryptogram;
    validate the authentication attempt based on the authentication cryptogram; and send a validated authentication attempt response to the first authentication device,
wherein a processor of the first authentication device executes instructions that are operative to:
prompt the user to enroll in offline authentication with the first authentication device in response to receiving the validated authentication attempt response;
receive confirmation from the user to enroll in offline authentication with the first authentication device;
receive a two-factor authentication (2FA) code from the user;
store a user ID and the 2FA code in a secure element in the first authentication device;
track a number of validated authentication attempt responses of the user received at the first authentication device;
compare the number of validated authentication attempt responses to a threshold; and
automatically share the 2FA code with a second authentication device when the number of validated authentication attempt responses of the user exceeds the threshold such that the user can authenticate offline with the second authentication device,
wherein a common entity controls both the first authentication device and the second authentication device.

14. The system of claim 13, the computer storage medium storing further instructions that are operative upon execution by the processor to:
generate a public-private key pair for the user mobile device, wherein the authentication cryptogram is based on a user device private key.

15. The system of claim 13, the computer storage medium storing further instructions that are operative upon execution by the processor to:
receive authentication details of an offline authentication from the first authentication device, wherein the authentication details comprise an authentication cryptogram and the 2FA code; and
validate the offline authentication based on the authentication cryptogram and the 2FA code.

16. The system of claim 15, the computer storage medium storing further instructions that are operative upon execution by the processor to:
send a validated authentication response to the first authentication device upon validating the offline authentication.

17. The system of claim 13, the computer storage medium storing further instructions that are operative upon execution by the processor to:
receive authentication details of an offline authentication from the second authentication device, wherein the authentication details comprise an authentication cryptogram and the 2FA code; and
validate the offline authentication based on the authentication cryptogram and the 2FA code.

18. A method for offline secure authentications, the method comprising:
receiving an authentication attempt, by a first authentication device, from a user mobile device of a user, wherein the user mobile device comprises a processor configured to generate an authentication cryptogram, and wherein the authentication attempt comprises a mobile device identifier, a user identifier, and the authentication cryptogram;
sending the authentication attempt, by the first authentication device, to an authenticator;
approving the authentication attempt, by the authenticator, based on the mobile device identifier, the user identifier, and the authentication cryptogram;
sending a validated authentication attempt response, by the authenticator, to the first authentication device,
receiving the validated authentication attempt response, by the first authentication device, from the authenticator;
in response to receiving the validated authentication attempt response, prompting the user to enroll in offline authentication with the first authentication device;
receiving confirmation from the user to enroll in offline authentication with the first authentication device;
receiving a two-factor authentication (2FA) code from the user, by the first authentication device;
storing the mobile device identifier, the user identifier, and the 2FA code, by the first authentication device, in a secure element in the first authentication device;
tracking, by the first authentication device, a number of validated authentication attempt responses of the user;
comparing, by the first authentication device, the number of validated authentication attempt responses to a threshold; and
automatically sharing, by the first authentication device, the 2FA code with a second authentication device when the number of validated authentication attempt responses of the user exceeds the threshold such that the user can authenticate offline with the second authentication device,
wherein a common entity controls both the first authentication device and the second authentication device.

19. The method of claim 18,
wherein automatically sharing the 2FA code with the second authentication device is performed via an entity network,
wherein the entity network stores the 2FA code and the user ID,
wherein the entity network shares the 2FA code with the second authentication device upon receiving the user ID from the second authentication device.

20. The method of claim 18,
wherein prompting the user to enroll in offline authentication comprises displaying an enrollment prompt on a user interface.

* * * * *